UNITED STATES PATENT OFFICE.

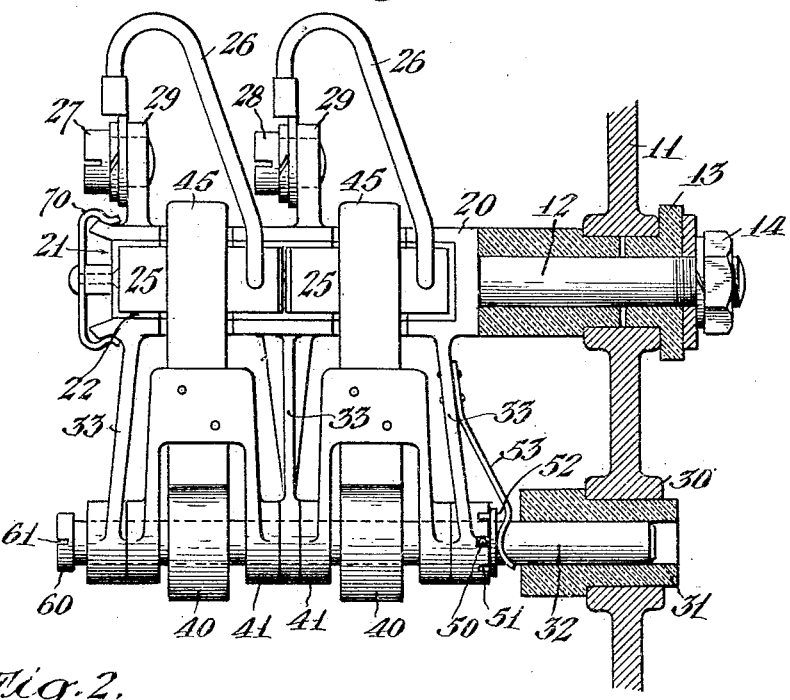
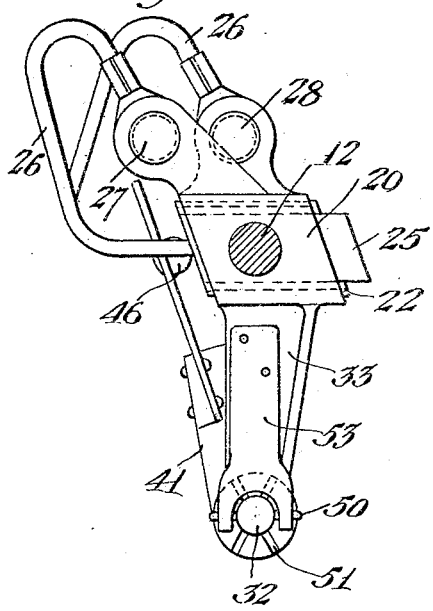
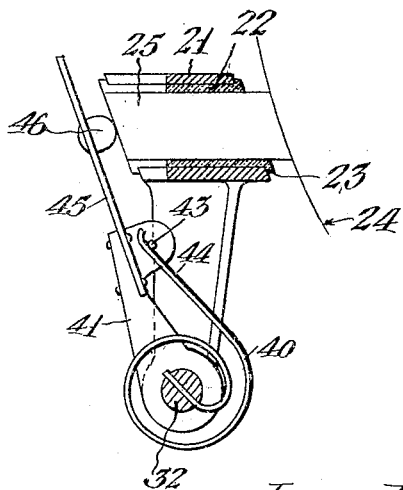

LAWRENCE A. MERK, OF LOS ANGELES, CALIFORNIA.

BRUSH-HOLDER.

1,396,451.  Specification of Letters Patent.  Patented Nov. 8, 1921.

Application filed April 11, 1921. Serial No. 460,603.

*To all whom it may concern:*

Be it known that I, LAWRENCE A. MERK, a citizen of the United States, residing at Los Angeles, county of Los Angeles, and State of California, have invented a new and useful Improvement Comprising the Brush-Holder, of which the following is a specification.

My invention relates to brushholders such as are used in dynamo electric machinery, and it is particularly applicable to brushholders which are used in confined spaces such as the interior of railway motors and the like.

The principal object of the invention is to provide a brushholder which may be used in such a confined space but which is readily accessible from the side for the purpose of removing, replacing, repairing or adjusting the brushes.

Further objects and advantages will be made evident hereinafter.

Referring to the drawing which is for illustrative purposes only,

Figure 1 is a plan view of a brushholder embodying my invention.

Fig. 2 is a side view and Fig. 3 is a section.

In the form of my invention shown, the frame of the dynamo-electric machine 11 is provided with a brushholder stud 12 carried in insulation 13 and secured by a nut 14. Formed on the stud 12 is a box 20 which is open at one end as shown at 21, and into which a sleeve 22 is readily slipped, this sleeve having shoulders 23 abutting the box 20. The commutator is shown at 24. Fitting tightly in the sleeve 22 are a plurality of carbon brushes 25, each having a flexible lead 26 secured by means of screws 27 and 28 to lugs 29 formed on the box 20. Formed in the frame 11 is a boss 30 having an insulating member 31 in which an adjusting stud 32 is free to turn and slide, this adjusting stud 32 passing through and sliding and turning in arms 33 formed on the box 21. The stud 32 is provided with slots into which the end of springs 40 fit, these springs being coiled as shown in Fig. 3, about the stud 32. Frames 41 are provided which are free to turn on the studs 32, each frame having a pin 43 which is engaged by the end 44 of the spring 40. Each of the frames 41 also has an extension 45 carrying a button 46, each pressing against one of the brushes 25. Passing through the adjusting stud 32 is a pin 50, this pin fitting in slots 51 formed in one of the arms 33 and being forced into these slots by means of a washer 52 and a spring 53.

The method of operation of my invention is as follows:

The tension on the brushes 25 may be easily adjusted by inserting a screw driver in a head 60, having an opening 61 on the end of the stud 32, and pushing this stud inwardly against the spring 53 until the pin 50 is pushed out of the slot 51 in which it normally rests. The stud 32 can then be readily turned by the screw driver to either increase or diminish the tension in the springs 44, and the pin 50 automatically enters one of the slots 51 and holds the tension when the pressure on the screw driver is released.

If it is desired to remove the brushes, the screws 27 and 28 are removed, the tension of the springs 44 are released and the sleeve 22 is slipped endwise through the opening 21 out of the box 20. The sleeve 22 is normally held in the box 20 by a spring finger 70 which engages the end of the box 20 as shown in Fig. 1. It will be evident that the brushholders may be readily taken out from the brushholder in a direction parallel to the face of the commutator 24 and through relatively a small space thus constituting a brushholder of special utility in confined relations.

I claim as my invention:

1. In a brushholder for dynamo electric machines the combination of a box; a sleeve free to be slid into said box along a line substantially parallel to the axis of the commutator served by the brushholder; means for retaining said sleeve in said box; and elastic means for sliding a brush placed in said box toward said commutator.

2. In a brushholder for dynamo electric machines the combination of a box; a sleeve free to be slid into said box along a line substantially parallel to the axis of the commutator served by the brushholder; spring clips for securing said sleeve in said box; and elastic means for sliding a brush placed in said box toward said commutator.

3. In a brushholder for dynamo-electric machines the combination of a sleeve for guiding a brush toward and away from the commutator served by the brushholder; a spring rod substantially parallel to the axis of said commutator; a spring coiled about said rod and having one end secured to said rod, the free end of said spring forcing said brush against said commutator; a lock for preventing the rotation of said rod; and means by which said lock can be released by an axial movement of said rod.

4. In a brushholder for dynamo-electric machines the combination of a sleeve for guiding a brush toward and away from the commutator served by the brushholder; a spring rod substantially parallel to the axis of said commutator; a spring coiled about said rod and having one end secured to said rod, the free end of said spring forcing said brush against said commutator; a lock for preventing the rotation of said rod; means on said rod for engaging a tool adapted to rotate the rod in one or the other direction as desired; and means by which an axial pressure by said tool releases said lock.

5. In a brushholder the combination of a supporting structure; a cylindrical rod fitting in a cylindrical hole in said structure; a brushholder spring coiled about said rod and having one end secured thereto; a lock preventing said rod from turning in said hole; and means by which axial movement of said rod releases said lock.

6. In a brushholder the combination of a supporting structure; a cylindrical rod fitting in a cylindrical hole in said structure; a brushholder spring coiled about said rod and having one end secured thereto; a lock on said rod for engaging said structure and preventing said rod from turning in said hole when said rod is in one extreme axial position; and means on said rod for sliding said rod axially to release said lock.

7. In a brushholder the combination of a supporting structure; a cylindrical rod fitting in a cylindrical hole in said structure; a brushholder spring coiled about said rod and having one end secured thereto; a lock on said rod for engaging said structure and preventing said rod from turning in said hole when said rod is in one extreme axial position; a spring tending to hold said rod in said extreme axial position; and means on said rod for sliding said rod axially to release said lock.

8. In a brushholder the combination of a supporting structure; a cylindrical rod fitting in a cylindrical hole in said structure; a brushholder spring coiled about said rod and having one end secured thereto; a lock on said rod for engaging said structure and preventing said rod from turning in said hole when said rod is in one extreme axial position; and means for simultaneously pushing said rod from said axial position and turning it with or against the tension of said spring to adjust same.

9. In a brushholder the combination of a supporting structure; a cylindrical rod fitting in a cylindrical hole in said structure; a brushholder spring coiled about said rod and having one end secured thereto; a lock on said rod for engaging said structure and preventing said rod from turning in said hole when said rod is in one extreme axial position; a spring tending to hold said rod in said extreme axial position; and means for simultaneously pushing said rod from said axial position and turning it with or against the tension of said spring to adjust same.

In testimony whereof, I have hereunto set my hand at Los Angeles, California, this 15th day of March, 1921.

LAWRENCE A. MERK.